C. PETIT.
DIVING CHAMBER FOR SUBMARINE OPERATIONS.
APPLICATION FILED MAR. 12, 1913.
Patented Sept. 1, 1914.
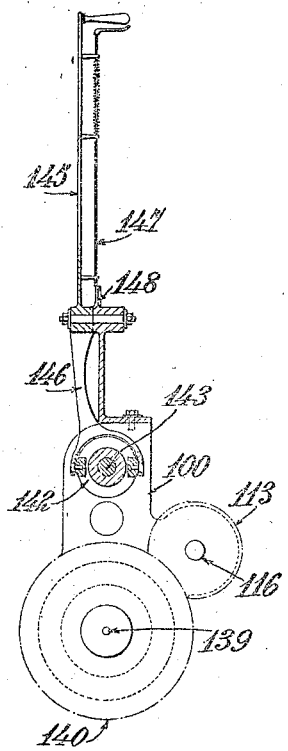
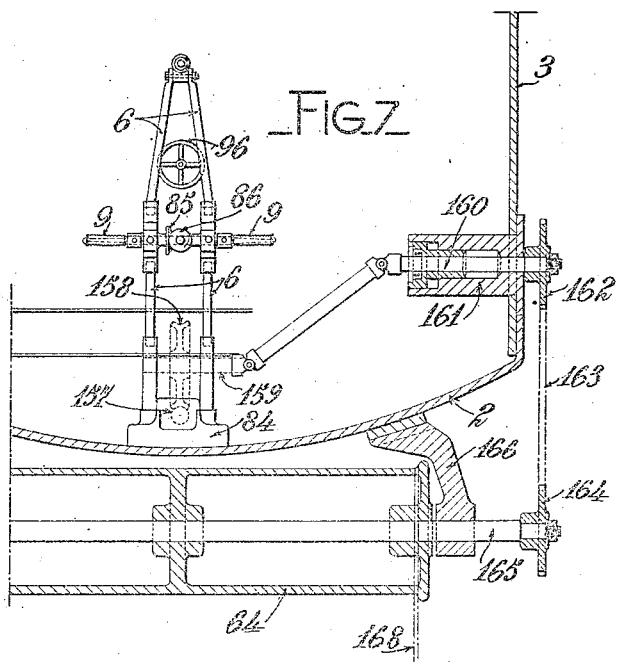
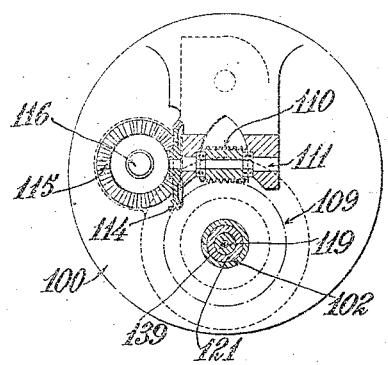

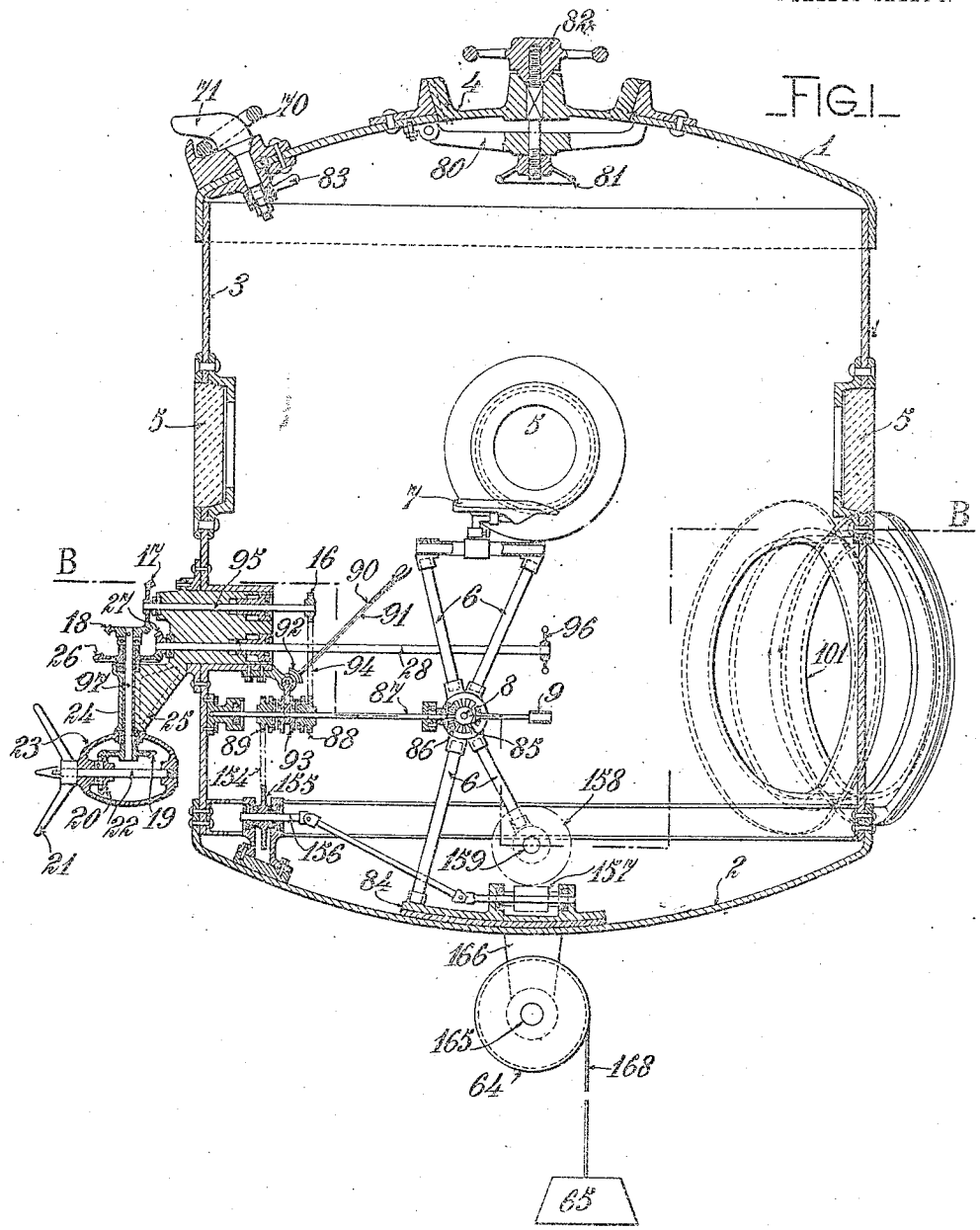

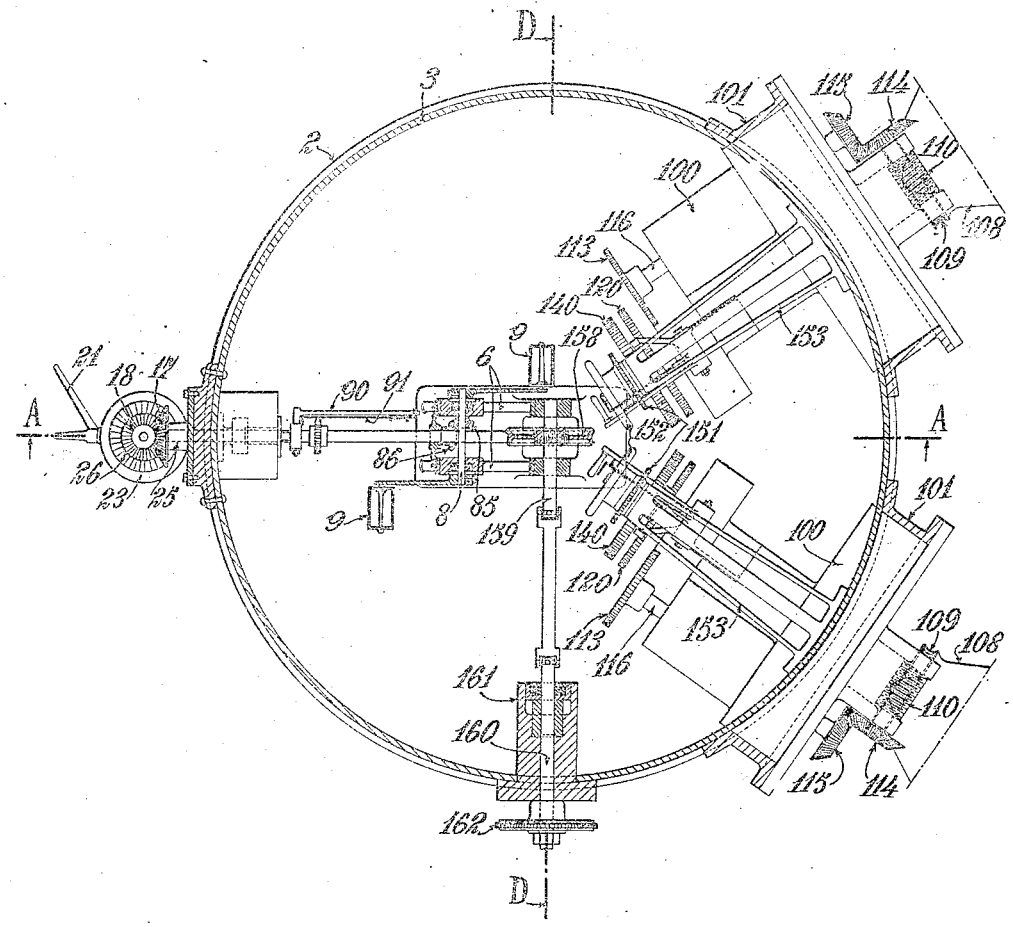

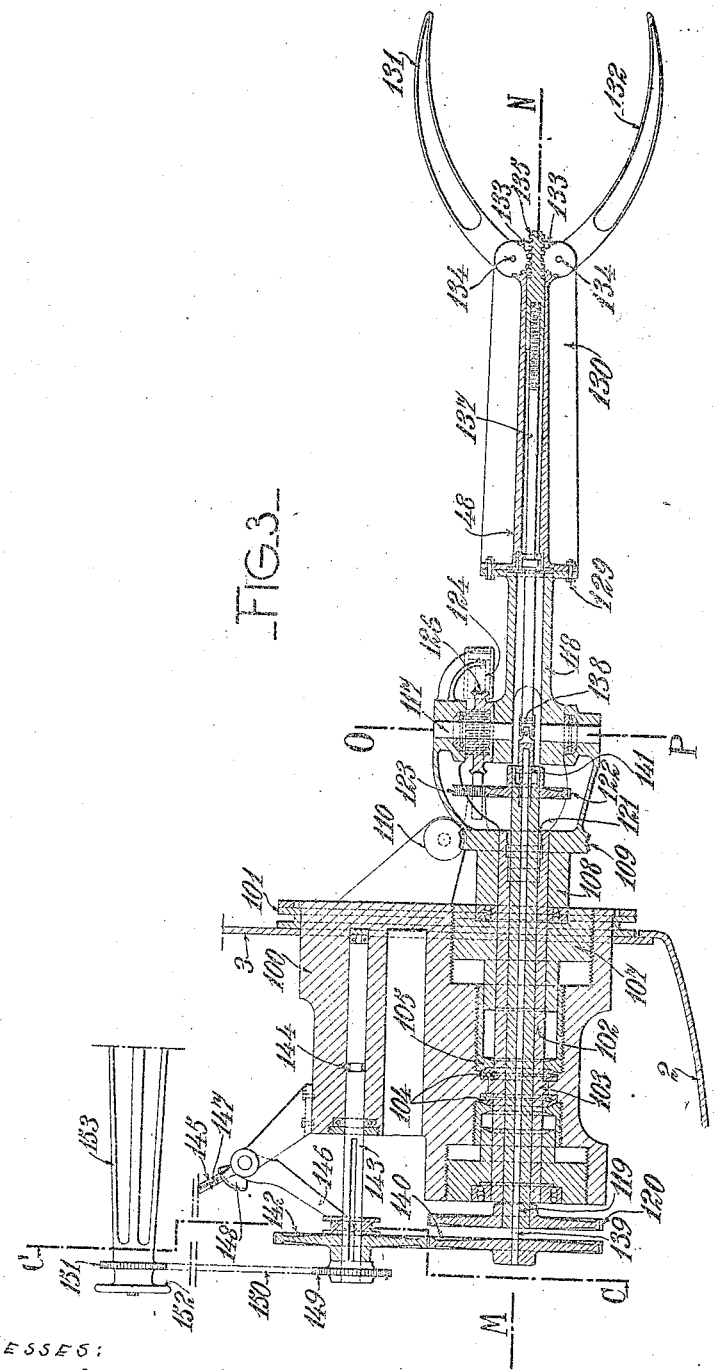

UNITED STATES PATENT OFFICE.

CHARLES PETIT, OF PARIS, FRANCE.

DIVING-CHAMBER FOR SUBMARINE OPERATIONS.

1,109,145.　　　Specification of Letters Patent.　　Patented Sept. 1, 1914.

Application filed March 12, 1913. Serial No. 753,675.

*To all whom it may concern:*

Be it known that I, CHARLES PETIT, a citizen of the Republic of France, residing at 9 Avenue Parmentier, Paris, France, have invented new and useful Improvements in Diving-Chambers for Submarine Operations, of which the following is a specification.

This invention relates to a diving chamber or apparatus for submarine exploration and operations at great depths which is adapted to receive one man or more and is provided with a mechanism actuated by means of pedals and driving either a screw propeller for the purpose of moving the apparatus in a horizontal plane or a weight carrying winch for the purpose of displacing the apparatus vertically, the apparatus being also provided with one or more working arms which can be steered and operated in all directions from the interior of the chamber.

In the accompanying drawings, which show, by way of example, a diving chamber constructed in accordance with the invention: Figure 1 is a vertical section of the same taken approximately along the line A—A, Fig. 2, the working arms being omitted. Fig. 2 is a horizontal section taken approximately along the line B—B, Fig. 1. Fig. 3 is a longitudinal section of a working arm, Fig. 4 is a vertical sectional view, taken approximately along the line C—C, Fig. 3, of the actuating mechanism for a working arm; Figs. 5 and 6 are details of the operating mechanism of a working arm, Fig. 7 is a vertical part section taken approximately along the line D—D, in Fig. 2, showing the actuating mechanism for the weight carrying drum.

The apparatus shown in the drawings comprises a tight hull or casing made of a metal sufficiently strong and resilient for supporting a heavy outer pressure without harmful or dangerous distortion. The hull or casing is formed of an upper cup 1, a cylindrical body 3 and a lower cup 2. The upper cup 1 is provided at its top with a man hole giving access to the interior of the apparatus. This man hole is closed by a Papin lid 4 which is held in position by a yoke 80 and may be opened either from the inside or the outside of the hull by means of hand wheels 81, 82. Three pivoting hooks 71 are provided on the upper cup for attaching the apparatus to chains 70 by which the apparatus is suspended to a cable attached to a boat. By rotating the hooks 71 on 180°, by means of the handle 83 thereof, the apparatus may be disengaged by a man therein from its supporting chains. Windows 5 of very thick glass are provided in the cylindrical body 3 of the casing.

At the center of the lower cup 2, there is a support 84 for a tubular frame 6 carrying at the top a saddle 7 which can rotate about a vertical axis so as to allow the man to turn easily. In the frame 6, is mounted a cross shaft 8 upon which the cranks carrying the pedals 9 are keyed. The shaft 8 has a bevel gear 85 fixed thereon, which actuates through a similar gear 86 a horizontal operating shaft 87. On said shaft 87 are loosely mounted two chain wheels 88, 89, which are each provided with clutch teeth on their adjacent sides. An oscillating arm 90 provided with a locking rod 91 coöperating with a notched segment 92 permits of displacing on the shaft 87 a sleeve 93 feathered on the same, so as to operate either the wheel 88 or the wheel 89. The chain wheel 88 operates through a driving chain 94 a sprocket pinion 16, shaft 95, bevel gears 17, 18, shaft 97 and bevel gears 19, 20, and the shaft 22 of a screw propeller 21.

The propeller 21 is mounted so that it can not only turn about its axis but can also be deflected about a vertical axis. To this end, the propeller shaft 22 is mounted in a box 23 provided with a vertical sleeve 24 which is rotatable in a bracket 25 fixed to the hull of the apparatus. This sleeve 24 carries at its upper end a pinion 26 meshing with another pinion 27, the shaft 28 of which rotates in the bracket 25 and carries, inside the diving chamber, a hand wheel 96. Both shafts 28 and 95 are provided with stuffing boxes and ball bearings. The shaft 97 and sleeve 24 are also mounted on ball bearings.

When the sprocket wheel 88 is coupled with the shaft 87 and the operator in the diving chamber works the pedals, the propeller 21 is rotated at a speed proportionate to that at which the pedals rotate. When he desires to alter the position of the propeller about its vertical axis, he only requires to turn the hand wheel 96. The movements imparted to the propeller by the pedals 9 and the hand wheel 96 being independent of each other, the angular adjustment and drive of the propeller may be effected simultaneously or separately.

The diving apparatus shown in the drawing is provided with two working arms operated separately from the interior of the apparatus and provided at their outer ends with grippers which can be brought to any point of a substantially hemispherical surface outside the diving chamber, and take hold of an object at this point. For each of said arms, is secured by a tight joint on the wall of the cylindrical body 3 a support 100 having a generally cylindrical outline, the fixation being effected for instance by means of a cylindrical socket 101 (Fig. 2). In the support, is rotatably mounted a hollow shaft 102 provided near the middle of its length with a collar 103 on both sides of which is a thrust ball bearing 104. Said bearings 104 are held by means of threaded sleeves 105 screwed into the support 100. The shaft 102 is carried at its ends in ball bearings mounted in stuffing boxes 107. The outer end of the shaft 102 which extends in the water in operation has keyed thereon a head 108 in which is cut a worm gearing 109 by means of which the shaft 102 can rotate under the action of a worm 110.

The worm 110 is carried on a shaft 111 (Fig. 6) which is journaled in two brackets integral with the support 100. On the shaft 111, is keyed a bevel gear 114 driven by another bevel gear 115 secured on a horizontal shaft 116 (Fig. 2). The shaft 116 is supported in the support 100 by means of two ball bearings and a stuffing box having the same action as those of the shaft 102. The shaft 116 carries at its inner end a driving pinion 113.

The head 108 which rotates with the shaft 102 has the shape of a yoke and carries a stub shaft 117 at right angles to the direction of the shaft 102. On the shaft 117 is keyed a member 118. The member 118 is rotated with the shaft 117 by means of the following arrangement. Through the hollow outer shaft 102, extends another hollow intermediary shaft 119 which is rotated from the interior of the apparatus by means of a toothed gear 120 secured on said shaft. On the outer end of said shaft which extends through a stuffing box 121, is secured a toothed gear 122 driving a gear 123 (Fig. 5) keyed on a horizontal countershaft 124. Said countershaft carries a worm 125 which drives a worm wheel 126 integral with the arm carrier 118. Two thrust ball bearings are provided for softening the rotation of the same. By means of the mechanism described, which forms a Cardan joint, the arm carrier 118 may be moved in all directions.

The working arm proper 48 which may be of tubular shape, is secured to the arm carrier 118, by means of bolts 129 having such a dimension and made of such a metal that they break if the weight suspended to the free end of the working arm is above a certain limit. By this means the apparatus may be disengaged in all cases, even if the working arm were entangled and could not be withdrawn. The whole arm 48 and the load carried thereby can be partially balanced or lightened by means of a cork lining 130 arranged around the arm and having suitable thickness.

The free end of the arm 48 carries, in the example shown, two jaws 131, 132, forming a gripper. The arm is provided for this purpose with two pairs of bosses 133 receiving the stub shafts 134 upon which the jaws are pivoted. The opening and closing movements of the gripper are transmitted to the latter by means of a rack 135 meshing with toothed segments formed on the jaws 131, 132. The rack 135 which is prevented from turning is internally threaded and screwed on the threaded end of a shaft 137 which extends through the arm 48 and arm carrier 118 and is rotated by a Cardan joint 138 from a central shaft 139. Said shaft 139 extends through the hollow intermediary shaft 119 and carries at its end inside the apparatus, the gear 140. A stuffing box 141 is also provided around said shaft 139. It will thus be seen that the gear 113 when engaged by the wheel 142 as hereinafter described rotates the working arm 48 about the axis M N, the gear 120 rotates said arm about the axis O P and the gear 140 has for its effect to open or close the gripper of the arm. All these movements being effected through the medium of a suitable worm or screw are irreversible. The three gears 113, 120 and 140 may be driven separately by a gear 142 (Fig. 3) which is splined on a horizontal shaft 143 so that it may be brought into engagement with any one of the three gears above mentioned. The shaft 143 is journaled by ball bearings in the support 100 and is protected against longitudinal displacement by a stop screw 144. The gear 142 is displaced along the shaft 143 by means of a pivoting lever 145 and a fork 146 of any usual type. A spring pressed rod 147 carried by the lever 145 can engage holes in a fixed segment 148 so that the lever and consequently the movable gear 142 are locked in any one of their positions. On the shaft 143 is keyed a sprocket wheel 149 connected by a chain 150 to a sprocket wheel 151 integral with a hand wheel 152 carried on a bracket 153 and within reach of the operator in the apparatus. By means of the arrangement previously described, the opening or closing of the gripper may be effected whatever the direction of the working arm may be. The construction is the same for both working arms.

The shape of the grippers or pincers may obviously be varied and the arm described may be replaced by any other suitable device according to the nature of the work to be performed, such as shears, flat pliers, bucket, basket, etc.

The shaft 87 operated from the pedals 9 may be coupled, as above stated with the sprocket wheel 89. Said wheel is connected through a chain 154 to a sprocket wheel 155 which drives through a shaft 156 and universal joints, a worm 157 (Fig. 7) meshing with a worm wheel 158. Said wheel 158 drives through the medium of a shaft 159 and universal joints a shaft 160 which extends through a support 161 secured in the wall of the diving chamber and carries on its outer end a sprocket wheel 162. The shaft 160 is journaled by means of a ball bearing in a stuffing box. The sprocket wheel 162 is connected by a chain 163 to a similar sprocket wheel 164 keyed on a horizontal shaft 165 which is journaled in two brackets 166 secured under the cup 2. On the shaft 166 is secured a winch drum 64, on which is wound a metal cable or chain 168 supporting a heavy weight 65. By reason of the non-reversibility of the worm 157, the winch drum is prevented from rotating under the influence of the weight 65. When the sprocket wheel 89 is coupled with the shaft 87, the operator by actuating the pedals 9 can rotate the drum 64 in one or the other direction to raise or lower the weight 65. This arrangement enables the operator, if the weight rests on firm ground and the apparatus is free to move, to make the apparatus rise or descend by operating the pedals so as to place it at any level to be explored.

Having now described my invention, what I claim as new and desire to secure by Letters Patent is:

1. In a diving apparatus for submarine operations, in combination: a tightly closed casing, an aperture giving access into said casing, means for closing said aperture, working arms mounted on the casing so as to have an universal movement thereon, means for actuating said arms from the interior of the casing, a screw propeller shaft supported from the casing, at the outside of the same, a screw propeller on said shaft, a frame supported in the casing, a saddle on said frame, an actuating shaft rotatably mounted in the frame, crank arms on said shaft, pedals on said crank arms and means operatively connecting the actuating shaft to the screw propeller shaft, substantially as described and for the purpose set forth.

2. In a diving apparatus for submarine operations, in combination: a tightly closed casing, an aperture giving access into said casing, means for closing said aperture, working arms mounted on the casing so as to have an universal movement thereon, means for actuating said arms from the interior of the casing, a screw propeller shaft supported from the casing, at the outside of the same, a screw propeller on said shaft a frame supported in the casing, a saddle on said frame, an actuating shaft rotatably mounted in the frame, crank arms on said shaft, pedals on said crank arms, means operatively connecting the actuating shaft to the screw propeller shaft, a box carrying the propeller shaft, a vertical sleeve on said box, a bracket secured to the casing and carrying said vertical sleeve, and means for rotating said sleeve about its longitudinal axis, substantially as described and for the purpose set forth.

3. In a diving apparatus for submarine operations, in combination: a tightly closed casing, an aperture giving access into said casing, means for closing said aperture, working arms mounted on the casing so as to have an universal movement thereon, means for actuating said arms from the interior of the casing, a screw propeller shaft supported from the casing, at the outside of the same, a screw propeller on said shaft, a frame supported in the casing, a saddle on said frame, an actuating shaft rotatably mounted in the frame, crank arms on said shaft, pedals on said crank arms, a winch carried by the casing, a cable wound on said winch, a weight attached to said cable and means for coupling the actuating shaft to either the screw propeller shaft or the winch substantially as described and for the purpose set forth.

4. In a diving apparatus for submarine operations, in combination: a tightly closed casing, an aperture giving access into said casing, means for closing said aperture, a support in the casing wall, an outer shaft rotatably mounted in said support, means including a worm for actuating said shaft, a stub shaft mounted in the outer end of the shaft, at right angles to the axis of the latter, a working arm pivoted on said stub shaft, an intermediary shaft, extending through the outer shaft, and driving the working arm, means including a worm for actuating said intermediary shaft, tools mounted on the working arm, a nonrotating internally threaded member actuating the tools, a threaded shaft screwed in said member, a central shaft extending through the intermediary shaft, means for actuating said central shaft and an universal joint connecting the threaded shaft to the central shaft, substantially as described and for the purpose set forth.

5. In a diving apparatus for submarine operations, in combination: a tightly closed casing, an aperture giving access into said casing, means for closing said aperture, a support in the casing wall, an outer shaft rotatably mounted in said support, means including a worm for actuating said shaft, a stub shaft mounted in the outer end of the shaft, at right angles to the axis of the latter, a working arm pivoted on said stub shaft, an intermediary shaft, extending through the outer shaft and driving the working arm, means including a worm for actuating said intermediary shaft, tools mounted on the working arm, a nonrotating internally threaded member actuating the tools, a threaded shaft screwed in said member, a central shaft extending through the intermediary shaft, means for actuating said central shaft, an universal joint connecting the threaded shaft to the central shaft, a hand wheel, a pinion movable axially, means for rotating said pinion from the hand wheel and means for displacing said pinion axially so as to engage the means for actuating the outer shaft, the intermediary shaft or the central shaft, respectively, substantially as described and for the purpose set forth.

6. In a diving apparatus for submarine operations, in combination: a tightly closed casing, a rotating shaft having one end extending outside the casing, a stuffing box in the casing wall, and a ball bearing in said stuffing box, for supporting the shaft, substantially as described and for the purpose set forth.

7. In a diving apparatus for submarine operations, in combination: a tightly closed casing, an aperture giving access into said casing, means for closing said aperture, working arms mounted on the casing so as to have an universal movement thereon, means for actuating said arms from the interior of the casing and buoyant means on said arms to lighten the same substantially as described and for the purpose set forth.

In testimony whereof I have signed my name to this specification in the presence of two subscribing witnesses.

CHARLES PETIT.

Witnesses:
 LOUIS MOSES,
 LUCIEN MEMMENGER.